(No Model.)
B. H. PLANTHABER.
WINDOW SCREEN.
No. 372,562. Patented Nov. 1, 1887.
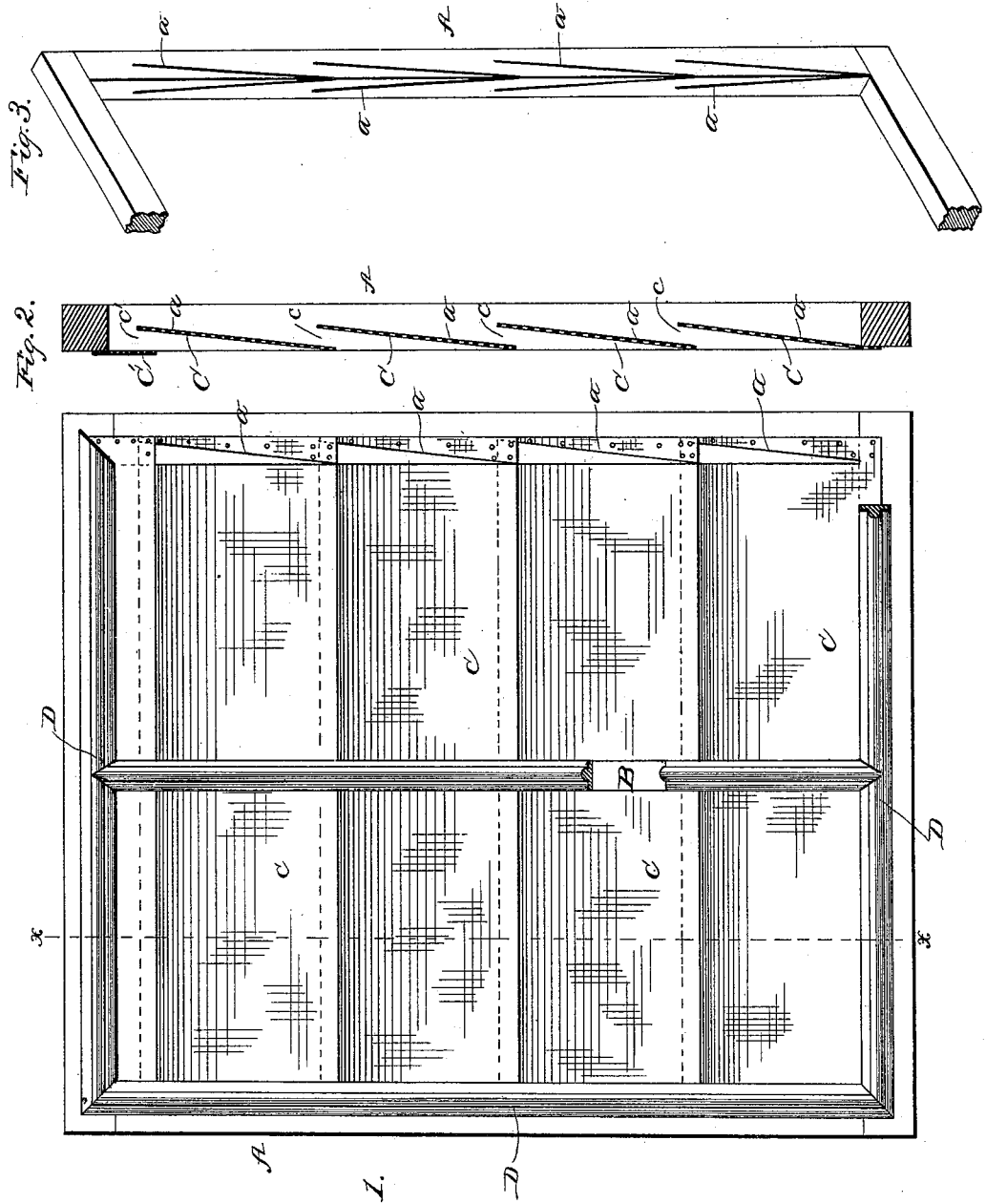

United States Patent Office.

BERNHARD H. PLANTHABER, OF MILWAUKEE, WISCONSIN.

WINDOW-SCREEN.

SPECIFICATION forming part of Letters Patent No. 372,562, dated November 1, 1887.

Application filed June 23, 1887. Serial No. 242,202. (No model.)

*To all whom it may concern:*

Be it known that I, BERNHARD H. PLANTHABER, of Milwaukee, in the county of Milwaukee, and in the State of Wisconsin, have invented certain new and useful Improvements in Window-Screens; and I do hereby declare that the following is a full, clear, and exact description thereof.

My invention relates to that class of screens in which a series of screen-sections are arranged within a suitable frame in such a manner that their adjacent edges will overlap one another and leave an open space between their opposing surfaces; and it consists in certain peculiarities of construction, to be hereinafter described with reference to the accompanying drawings, and subsequently claimed.

In the drawings, Figure 1 represents an elevation, partly broken away, of a window-screen constructed according to my invention; Fig. 2, a section taken on line x x, Fig. 1; and Fig. 3, a detail view in perspective of a side piece forming part of the screen-frame.

Referring by letter to the drawings, A represents a frame, that may be made of any suitable material and dimensions, and while I have shown said frame as provided with a brace-piece, B, the latter may be omitted or a series of such brace-pieces employed.

Beginning at the extreme inner corner of each side piece of the frame, I make a series of cuts, a, that extend outwardly at an acute angle to a vertical, so that a portion of each cut will appear on both the inner face and inner edge of said side piece and will overlap the cut next adjacent. These cuts form seats for the ends of overlapping reticulated or foraminous screen-sections C, and when a brace-piece, B, is used, the latter is necessarily provided with a series of cuts that extend across its entire width in an outward direction at an acute angle to a vertical. By the peculiar arrangement of the cuts a open spaces c will be left between the opposing surfaces of the overlapping sections C.

To the top and side pieces of the frame A, I secure a vertical section, C', of reticulated or foraminous material, and the lower edge of this section overlaps the upper edge of the next adjacent section C, to leave an open space, c', between their opposing surfaces. If desired, a molding, D, may be attached to the frame, as shown by Fig. 1; but this is a matter of preference, and forms no part of my invention.

In setting up the screen I place the sections C in the cuts a and tack them down at one end. The stretch of said sections is now taken up from the other ends, and after this operation has been accomplished these latter ends are also secured by tacking. Heretofore it has been found very difficult to make the screen-sections taut; but by my peculiar arrangement of cuts in the side pieces of the frame I can always get a direct draw on said sections to take up the slack.

Flies and other insects have a tendency to move upward upon any surface on which they may alight, and should they come upon the outside of any one of the reticulated or foraminous sections of my screen they will ascend to the top edge thereof, either fly off or fly across to the next adjacent section, and then continue their ascent, while the insects that come upon the screen from the inside will ascend the first section on which they alight, pass outside through the open space, and either fly away or continue to ascend said screen, as described in the beginning of this paragraph.

Having thus fully described my invention, what I claim as new, and desire to secure by Letters Patent, is—

A screen-frame having its side pieces provided with a series of overlapping cuts that begin at the extreme inner corner of each side piece and extend outwardly at an acute angle to a vertical, so that a portion of each cut will appear on both the inner face and inner edge of said side piece, in combination with a series of reticulated or foraminous sections arranged in said cuts and secured to the frame, substantially as set forth.

In testimony that I claim the foregoing I have hereunto set my hand, at Milwaukee, in the county of Milwaukee and State of Wisconsin, in the presence of two witnesses.

BERNHARD H. PLANTHABER.

Witnesses:
H. G. UNDERWOOD,
N. E. OLIPHANT.